(12) United States Patent
McMillen

(10) Patent No.: US 7,137,422 B2
(45) Date of Patent: Nov. 21, 2006

(54) MOTORCYCLE TRANSPORTATION COVER

(76) Inventor: Brett William McMillen, P.O. Box 1366, Telluride, CO (US) 81435

( * ) Notice: Subject to any disclaimer, the term of this patent is extended or adjusted under 35 U.S.C. 154(b) by 53 days.

(21) Appl. No.: 10/870,164

(22) Filed: Jun. 17, 2004

(65) Prior Publication Data

US 2005/0279436 A1    Dec. 22, 2005

(51) Int. Cl.
  *B65H 65/02*    (2006.01)
  *B65H 65/30*    (2006.01)
  *B65D 85/00*    (2006.01)
(52) U.S. Cl. .................. 150/167; 150/166; 206/135; 296/78.1; 296/136.1; 296/136.07
(58) Field of Classification Search ............. 150/166, 150/167; 296/78.1, 136.1, 136.01, 136.07, 296/136.13; 206/335
See application file for complete search history.

(56) References Cited

U.S. PATENT DOCUMENTS

| | | | | |
|---|---|---|---|---|
| 603,377 | A * | 5/1898 | Skrine | ............................ 410/3 |
| 1,409,666 | A * | 3/1922 | Calise | ........................ 362/512 |
| 1,728,437 | A * | 9/1929 | Mott | ........................... 150/166 |
| 2,311,514 | A * | 2/1943 | Ora | ............................ 150/166 |
| 3,659,872 | A | 5/1972 | Warner | |
| 3,968,913 | A * | 7/1976 | Weed et al. | ................. 224/488 |
| 4,283,084 | A | 8/1981 | Gallagher | |
| 5,193,724 | A | 3/1993 | Robbins | |
| 5,372,169 | A | 12/1994 | Norton et al. | |
| 5,445,200 | A * | 8/1995 | Celestino et al. | ........... 150/167 |
| 5,562,139 | A * | 10/1996 | Cseri | ........................... 150/167 |
| 5,564,358 | A * | 10/1996 | Newton | ...................... 114/361 |
| 5,921,389 | A | 7/1999 | Zoffer | |
| 6,040,764 | A * | 3/2000 | Crisci | ........................ 340/432 |
| 6,092,856 | A * | 7/2000 | Ladensack | ............. 296/100.11 |
| 6,209,599 | B1 | 4/2001 | Richardson | |
| 6,405,771 | B1 | 6/2002 | Mote | |
| 6,588,827 | B1* | 7/2003 | Heiland | ...................... 150/166 |
| 2002/0109373 | A1 | 8/2002 | Jensen | |
| 2005/0247387 | A1* | 11/2005 | Hooker et al. | .............. 150/167 |

FOREIGN PATENT DOCUMENTS

DE    4213254 A1 * 10/1993
EP    0439155 A1 *  7/1991

* cited by examiner

*Primary Examiner*—Sue A. Weaver
(74) *Attorney, Agent, or Firm*—Henry L. Smith, Jr.

(57) ABSTRACT

A weather-proof, wind-proof one-piece cover bag, for a motorcycle or other vehicle being transported on an open vehicle or trailer, comprises a bag made of durable, and flexible material provided with two or more tie down slits to accommodate tie down straps securing the motorcycle to the vehicle and several straps securing the cover bag to the belly of the motorcycle and the front and back wheels of the motorcycle.

20 Claims, 3 Drawing Sheets

MOTORCYCLE TRANSPORTATION COVER

BACKGROUND

1. Field of Invention

The field of the Invention is a cover for a motorcycle, especially for transporting a motorcycle on an open carrier under various weather conditions. Throughout this patent application, references to motorcycles also include bicycles, all terrain vehicles (ATV's), snowmobiles, and similar vehicles, unless the context clearly requires otherwise.

2. Description of Prior Art

Over the years various coverings have been developed for motorcycles or similar small vehicles. Representative of prior art are the following patent documents.

U.S. Pat. No. 4,283,084, Aug. 11, 1981, to Gallagher, discloses a partial cover for a motorcycle, which mainly protects only the body, and apparently would offer little protection from rain, dust, road splash, etc. when used on a motorcycle being transported on an open vehicle.

U.S. Pat. No. 5,372,169, Dec. 13, 1994, to Norton, discloses a bag-like covering which is secured around a bicycle by a drawstring around the opening of the bag. There is apparently no provision for letting tie down cables pass through it.

U.S. Pat. No. 6,209,599, Apr. 3, 2001, to Richardson, discloses a form-fitting motorcycle cover comprised of several pieces secured by a complex pattern of elastic cords.

SUMMARY OF INVENTION

The Invention is a cover bag which is placed over a motorcycle which has been placed upon an open carrier such as a trailer (or open bed of a pickup truck), and secured to the trailer by several tie down cables. The cover bag, typically made up of a strong and waterproof material, is shaped to fit over the motorcycle or other vehicle and can be secured to the vehicle in a virtually weather proof manner. The cover bag also has special openings to allow tie down cables to pass through the bag so that the tie down arrangement for the motorcycle is not disturbed when the cover bag is put on the motorcycle. Typically there will be a tie down on each handlebar, about midway in the handlebar, and the back the tie downs are typically attached to the rear swing arm or frame.

OBJECTS AND ADVANTAGES

The objects and advantages of the present Invention are:

1. To provide a weatherproof covering for a motorcycle or similar vehicle to protect it from dust, wind, rain, hail, road splash, road grit and pebbles, mud or similar conditions encountered when transporting a motorcycle on a carrier open to the weather.

2. To provide a covering for a motorcycle being transported, which covering substantially obscures the view of the motorcycle, thus making it less of a target for theft.

3. To provide an inexpensive covering for a motorcycle being transported.

4. To provide an easily manufactured covering for a motorcycle being transported.

5. To provide a light weight and durable covering for a motorcycle being transported.

6. To provide a covering for a motorcycle being transported which allows the tie down cables which secure the motorcycle to the transporting vehicle to remain in place even when the covering is on the motorcycle.

7. To provide a covering for a motorcycle being transported which protects its paint and upholstery from deterioration due to ultraviolet light from the sky.

8. To provide a windproof and waterproof covering for a motorcycle which may be quickly placed upon a motorcycle and secured to it.

9. To provide a motorcycle cover which may also be used when a motorcycle is not being transported.

10. To provide a motorcycle covering which securely covers the entire motorcycle.

11. To provide a motorcycle covering which can be put on a motorcycle even without removing the tie down cables.

DRAWING FIGURES

Figure 1:
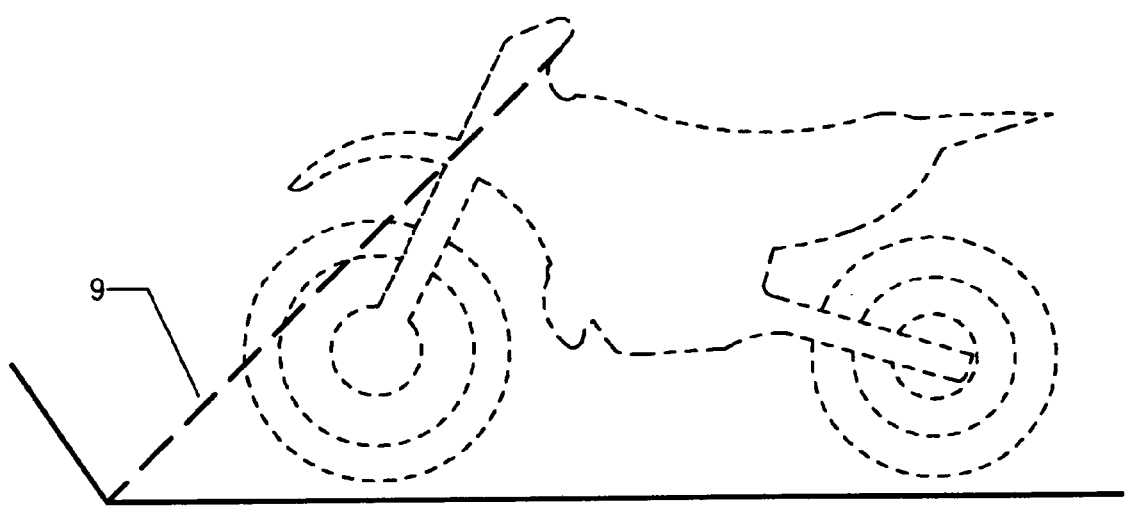
FIG. 1 shows a side view of a motorcycle and tie down strap in dotted lines; the motorcycle is shown mounted on the flat surface of a trailer or other transportation vehicle.

REFERENCE NUMERALS IN DRAWINGS 1 tie down slits
2 front wheel buckle
3 wheel straps
4 zipper or Velcro flap
5 foot peg opening
6 cover bag
7 bottom edge of cover bag
8 tie down hole
9 tie down strap
10 gas tank opening flap
11 snaps
12 belly strap
13 grommets

DETAILED DESCRIPTION OF THE DRAWINGS

FIG. 1 shows a side view of a motorcycle in dotted lines and tie down strap 9; the motorcycle is in position on the flat surface of a trailer or other transportation vehicle.

Figure 2:
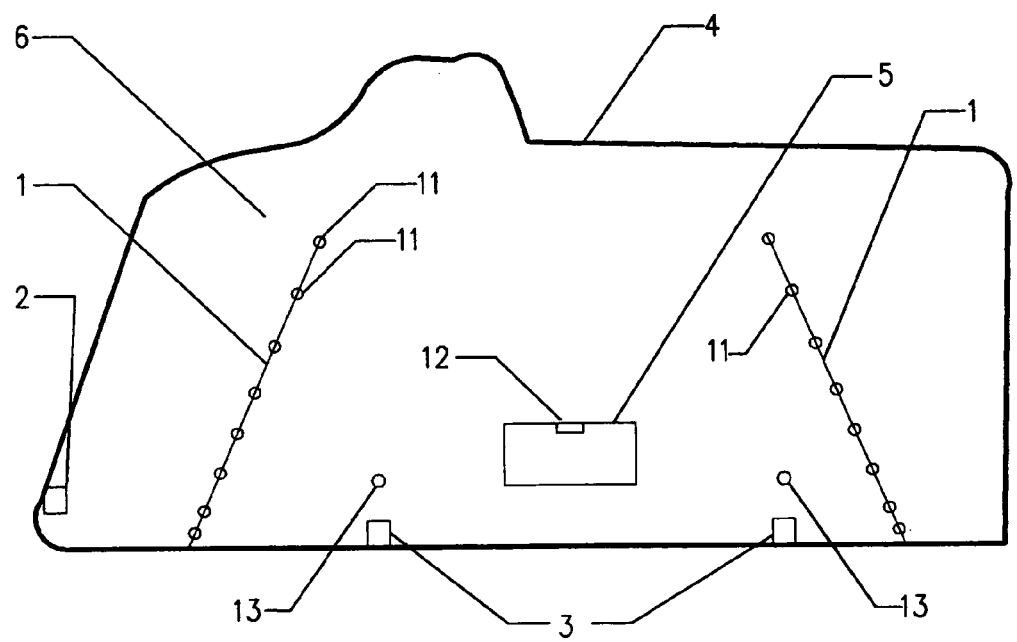
FIG. 2 is a side view of the Invention in place over the motorcycle of FIG. 1.

FIG. 2 is a side view of the cover bag 6 of the Invention in place over the motorcycle shown in FIG. 1. The bag contains four tie down slits 1, one on each side of the front of the bag, and one on each side of the back of the bag. The slits enable the tie down straps 9 to emerge from the Invention. Because of the tie down slits 1, the Invention can be placed over the motorcycle after the tie down straps 9 are already in place. The tie down slits 1 are the closed by means of multiple snaps 11. At the top of the Invention is an optional zipper or Velcro flap 4 which provides access to the top portion of the motorcycle. At the lower front of the Invention is front wheel buckle 2. This buckle, with its strap, is attached to the front of the sides of the cover bag 6. When the front wheel buckle 2 is tightened, the whole cover bag 6 is pulled forward and tightened against the side of the front wheel of the motorcycle, since the back of the cover bag will thereby be pulled forward against the back of the motorcycle. Two grommets 13 are shown on the side of the Invention; there are corresponding grommets 13 on the other side of the Invention, not shown. These grommet holes enable a locking cable to pass through the Invention and the wheels of the motorcycle and then to be attached to some part of the trailer or other transportation vehicle to prevent theft of the motorcycle. Wheel straps 3 are also shown for securing the Invention to the wheels of the motorcycle to prevent the Invention from flapping in the wind caused by the motion of the trailer. The Figure also shows belly strap 12 and foot peg opening 5.

Figure 3:
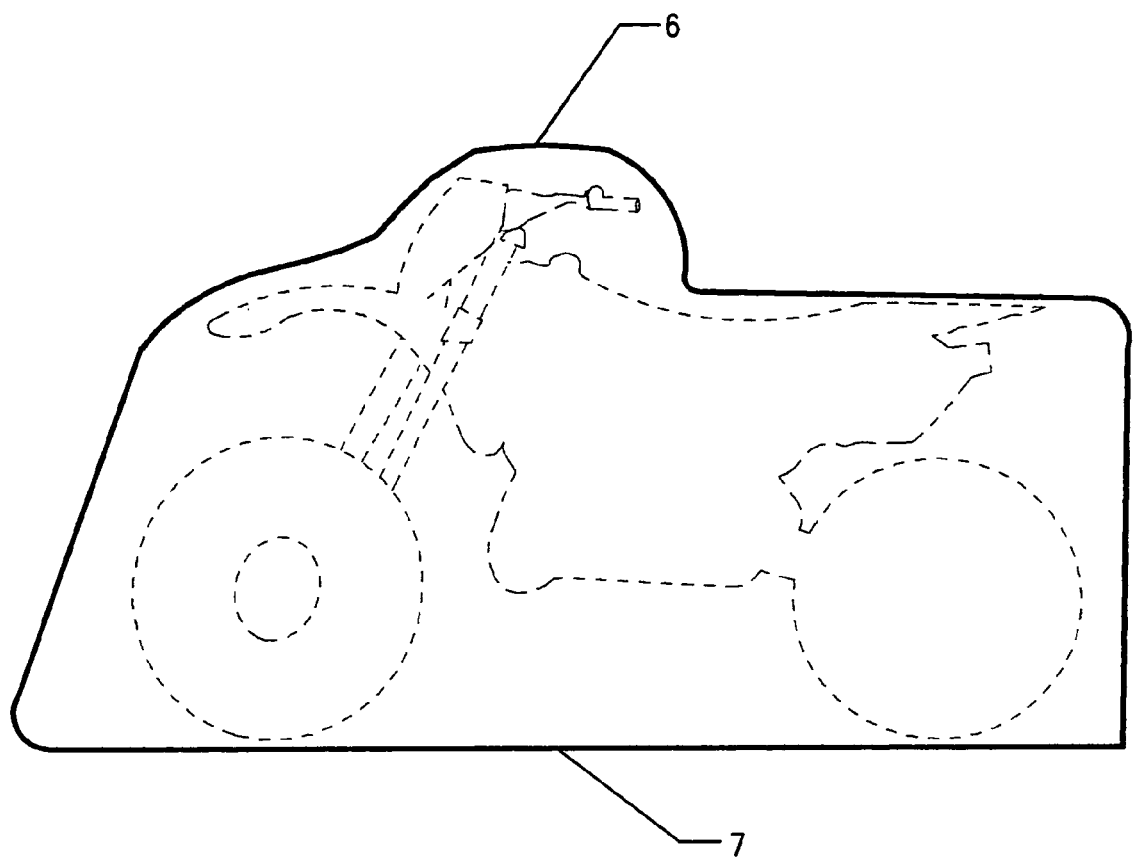
FIG. 3 is a side view of the cover bag which shows the motorcycle in dotted lines inside the Invention.

FIG. 3 shows the motorcycle in dotted lines inside the Invention, cover bag 6. Also shown is the bottom edge of the cover bag 7, which is open and generally in contact with the trailer transporting the motorcycle.

Figure 4:
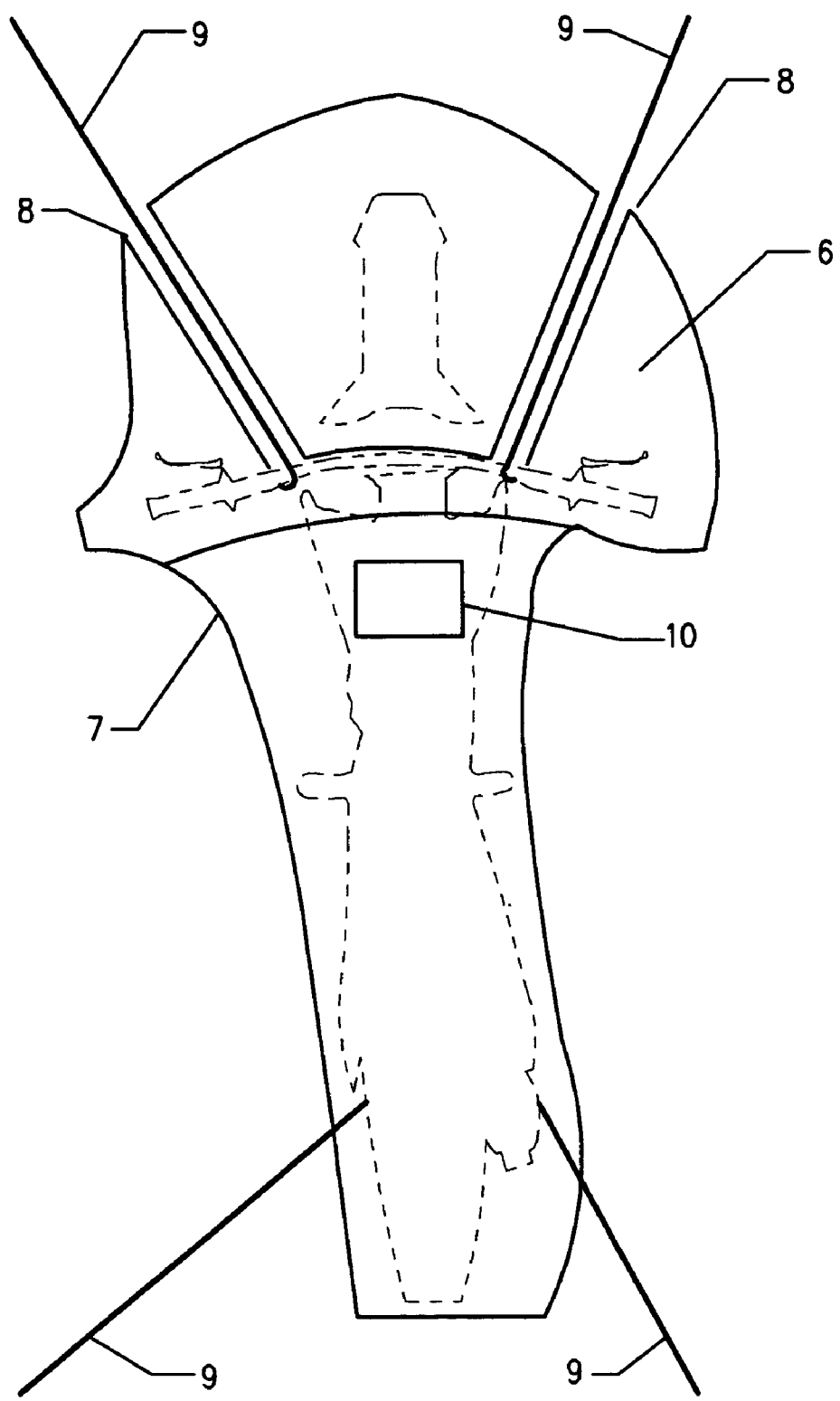
FIG. 4 is a view looking down on the Invention in place over a motorcycle inside the Invention, which is shown in dotted lines. Also shown are four tie down straps 9, two of which are attached to the handle bars of the motorcycle, and two of which are attached to the rear portion of the motorcycle frame.

FIG. 4 is a view looking down on the Invention cover bag 6. The motorcycle inside the Invention is shown in dotted lines; also shown are four tie downs straps 9 which secure the handle bars of the motorcycle and the rear portion of the motorcycle frame to the transporting trailer. A gas tank opening flap 10 is also shown in the top of the Invention for access to the gas tank area of the motorcycle. The tie down straps 9 pass through tie downs holes 8 in the Invention; these holes are formed by the snaps 11 (not shown) in the tie down slits 1. In other words, each tie down strap 9 passes through a gap in the tie downs slits 1 between a pair of snaps 11. The bottom edge of the cover bag 7 is also shown, which typically touches the trailer surface.

DESCRIPTION—PREFERRED EMBODIMENT

The motorcycle cover is preferably made of 1000 Cordura or similar material. Cordura is a nylon-based heavy duty woven fabric similar to canvass and is available from Ski Area Supplies, 6661 Arapahoe Road, Boulder, Colo. 80303. Other suitable materials which might be used include 420 Ripstop Nylon, available from the same company. These materials are easily cut into pieces of the appropriate size and shape and are easily assembled by stitching or riveting. The cover bag is secured to the motorcycle by means of a series of adjustable locking straps, known to those skilled in the art. These straps are placed under the belly of the motorcycle and front and back wheels. The cover bag fits over the two front tie down straps extending from the handlebars to the surface of the trailer or other transporting vehicle. The fitting over the tie downs is accomplished via two slit openings that are at the same angle, and near the front forks of the bike. After installation, the slits are closed by a series of stainless steel snaps. There are two similar slits, and series of snaps for sealing them, at the rear of the cover to accommodate rear tie down cables. Other slit closure means could be used such as hooks and eyelets, Velcro pairs, or zippers. Near the bottom of the cover bag are two belly straps that snug the cover around the girth of the motorcycle, as well as a front wheel strap to snug the cover around the front wheel, to prevent entry of wind during transportation, and to prevent the wind from causing the cover to flap in the wind. Other belly securing means and wheel securing means would include snaps, Velcro pairs, or elastic bands. There are also two grommets on either side of the cover near each wheel to facilitate a cable lock attached to the motorcycle frame and trailer frame if desired for extra security. The bottom of the bag has a foot peg opening (for example, a rectangular, triangular or other shaped cut) on both sides to expose the foot pegs of the bike, so that they do not rub against the bag material. The belly straps are on both sides of the opening. The bag may have a zipper, or Velcro flap, on the top edge, to expose the gas tank opening in the upper part of the bike body, for filling the tank with the cover in place. The bag is wide enough in the handlebar area to completely cover the handlebars. A gas tank opening flap may also be provided in the top of the cover bag.

OPERATION OF THE INVENTION

The cover bag is lowered down over the motorcycle, and the tie down cables pass through the slits in the bag, and the slits are then closed tightly around the tie downs by the series of mating snaps. The cover bag is secured around the bottom of the motorcycle body by two belly straps, each extending from one side of the lower portion of the bag, under the motorcycle belly, and to the same area of the other side of the bag. The straps are tightened by adjustable belt buckles known to those skilled in the art. A front wheel strap extending from the bottom front portion of the side of the bag, and back to the same location of the other side of the bag, secures the bag to the front wheel of the motorcycle. There is a similar back wheel strap to secure the bottom edge of the cover bag to the back wheel. Other wheel securing means would include snaps, Velcro pairs and an elastic band. The front wheel buckle is a combination strap and buckle which is tightened to pull the whole cover bag forward and secure it to the front portion of the front wheel. Tension against the front wheel is maintained because the cover bag can come forward only a limited amount since the back portion of the cover bag is pressed up against the back end of the motorcycle. Other front wheel securing means would include an elastic band or strap attached at one end at the same place as the front wheel buckle, and attached at the other end to the back of the motorcycle frame or to a rear wheel.

TESTS

The cover was tested during the 2002 National Enduro Season, as well as other transportation situations. The cover survived and performed well in an open road 3-rail trailer transport from Telluride, Colo. to Greensboro, Ga. at speeds upward of 65 miles per hour. It also survived and performed well in a trip from Telluride, Colo. to Phoenix, Ariz. in February of 2004.

ADDITIONAL EMBODIMENTS

Variations on the cover include larger size for larger motorcycles, as well as ATV's, snowmobiles and bicycles, and a limited edition version in leather with wool liner for antique bikes. Other variations include versions for automobiles, jet skis and car roof racks.

CONCLUSIONS RAMIFICATIONS AND SCOPE

A number of changes are possible to the parts and configuration described above while still remaining within the scope and spirit of the Invention. The specifics about the form of the Invention described in this application are not intended to be limiting in scope. The scope of the Invention is to be determined by the claims and their legal equivalents, not the examples given above.

I claim:

1. A bag-like cover for a motorcycle, bicycle, all-terrain vehicle, snowmobile, jet ski, or other similar recreational vehicle, secured by tie down straps attached to the recreational vehicle and a second vehicle, for transporting said recreational vehicle on a flat surface of a second vehicle, comprising:

(a) a flexible one-piece cover bag sized and shaped to conform to the size and shape of said recreational vehicle and adapted to be lowered down over said recreational vehicle, with tie down straps in place, so that the bottom edge of the cover bag extends down to the flat surface of a second vehicle, (b) one or more tie down slits in said cover bag extending upwards from the front and rear portions of the bottom edge of the cover bag, and angled toward the front portion and back portion respectively of the recreational vehicle where tie down straps attach the recreational vehicle to the flat surface of a second vehicle, and (c) a plurality of snaps or other slit closure means positioned along the entire length of the tie down slits and adapted to substantially close the length of the tie down slits while allowing the tie down straps to the extend, at any particular point along the tie down slits as required by the particular angle and position of the tie down straps, through an appropriately positioned tie down hole in the tie down slit formed, at the particular position required by the particular angle and position of the tie down straps, between a pair of snaps or other slit closure means, whereby the cover bag can be fitted over said recreational vehicle after it is secured by the tie down straps, which may be at various angles and positions, to a flat surface, and whereby tie down straps attached to the flat surface can extend, at various angles and positions, through the tie down holes, and whereby the recreational vehicle is protected from rain, snow, mud, dirt, and dust while being transported on an open flat surface of a second vehicle.

2. The device of claim 1 further comprising a foot peg opening in the lower center portion of each side of the cover bag, and a belly strap extending from one surface of the cover bag at the foot peg opening, through the cover bag, and to the opposite surface of the cover bag at the opposite foot peg opening, whereby the belly strap may be secured underneath the recreational vehicle.

3. The device of claim 1, further comprising one or more wheel straps attached to the bottom edge of the cover bag near the bottom of the wheels of the recreational vehicle and adapted to secure the bottom edge of the cover bag to, or under, the wheels of the recreational vehicle.

4. The device of claim 2, further comprising one or more wheel straps attached to the bottom edge of the cover bag near the bottom of the wheels of the recreational vehicle and adapted to secure the bottom edge of the cover bag to, or under, the wheels of the recreational vehicle.

5. The device of claim 1, further comprising one or more pairs of grommets on opposite sides of the cover bag near the bottom edge of the cover bag, whereby a security cable may pass through the grommets and one or more wheels of the recreational vehicle and through some part of the second vehicle, thereby, in combination with a cable lock, securing the recreational vehicle to the second vehicle and preventing theft of said recreational vehicle.

6. The device of claim 2, further comprising one or more pairs of grommets on opposite sides of the cover bag near the bottom edge of the cover bag, whereby a security cable may pass through the grommets and one or more wheels of the recreational vehicle and through some part of the second vehicle, thereby, in combination with a cable lock, securing the recreational vehicle to the second vehicle and preventing theft of said recreational vehicle.

7. The device of claim 3, further comprising one or more pairs of grommets on opposite sides of the cover bag near the bottom edge of the cover bag, whereby a security cable may pass through the grommets and one or more wheels of the recreational vehicle and through some part of the second vehicle, thereby, in combination with a cable lock, securing the recreational vehicle to the second vehicle and preventing theft of said recreational vehicle.

8. The device of claim 4, further comprising one or more pairs of grommets on opposite sides of the cover bag near the bottom edge of the cover bag, whereby a security cable may pass through the grommets and one or more wheels of the recreational vehicle and through some part of the second vehicle, thereby, in combination with a cable lock, securing the recreational vehicle to the second vehicle and preventing theft of said recreational vehicle.

9. The device of claim 1, further comprising a gas tank opening flap, and a zipper or Velcro flap in the upper center portion of the cover bag, through which access may be gained to the center upper portion of the recreational vehicle or to the gas tank of the recreational vehicle.

10. The device of claim 2, further comprising a gas tank opening flap, and a zipper or Velcro flap in the upper center portion of the cover bag, through which access may be gained to the center upper portion of the recreational vehicle or to the gas tank of the recreational vehicle.

11. The device of claim 3, further comprising a gas tank opening flap, and a zipper or Velcro flap in the upper center portion of the cover bag, through which access may be gained to the center upper portion of the recreational vehicle or to the gas tank of the recreational vehicle.

12. The device of claim 4, further comprising a gas tank opening flap, and a zipper or Velcro flap in the upper center portion of the cover bag, through which access may be gained to the center upper portion of the recreational vehicle or to the gas tank of the recreational vehicle.

13. The device of claim 5, further comprising a gas tank opening flap, and a zipper or Velcro flap in the upper center portion of the cover bag, through which access may be gained to the center upper portion of the recreational vehicle or to the gas tank of the recreational vehicle.

14. The device of claim 6, further comprising a gas tank opening flap, and a zipper or Velcro flap in the upper center portion of the cover bag, through which access may be gained to the center upper portion of the recreational vehicle or to the gas tank of the recreational vehicle.

15. The device of claim 7, further comprising a gas tank opening flap, and a zipper or Velcro flap in the upper center portion of the cover bag, through which access may be gained to the center upper portion of the recreational vehicle or to the gas tank of the recreational vehicle.

16. The device of claim 8, further comprising a gas tank opening flap, and a zipper or Velcro flap in the upper center portion of the cover bag, through which access may be gained to the center upper portion of the recreational vehicle or to the gas tank of the recreational vehicle.

17. The device of claim 1 further comprising a belly securing means extending from the lower portion of one side of the cover bag to the corresponding other side of the cover bag, whereby the belly securing means secures the lower portion of the cover bag underneath the recreational vehicle.

18. The device of claim 1, further comprising one or more wheel securing means attached to the bottom edges of the cover bag near the bottom of the wheels of the recreational vehicle and adapted to secure the bottom edges of the cover bag to, or under, the wheels of the recreational vehicle.

19. The device of claim 1, further comprising a front wheel securing means attached to the lower front portion of the cover bag near the front portion of the wheel or wheels of the recreational vehicle and adapted to secure the lower front portion of the cover bag to the front wheel or wheels of the recreational vehicle, by pulling the cover bag forward toward the front wheel or wheels of the recreational vehicle, whereby tension in the cover bag is created since the back of the cover bag is pulled against the back of the recreational vehicle.

20. The device of claim 1, further comprising a front wheel securing means attached at one end to the lower front portion of the cover bag near the front portion of the wheel or wheels of the recreational vehicle, and attached at the other end to the back of the recreational vehicle or rear wheel or wheels of the recreational vehicle, and adapted to secure the lower front portion of the cover bag to the front wheel or wheels of the recreational vehicle.

* * * * *